3,298,987
COATED FIBROUS WEB AND COATING
COMPOSITION THEREFOR
George P. Colgan, Whippany, N.J., and Joseph J. Latimer, Mountain Lake Park, Md., assignors, by mesne assignments, to Cumberland Chemical Corporation, New York, N.Y., a corporation of Delaware
No Drawing. Filed Dec. 31, 1963, Ser. No. 334,902
3 Claims. (Cl. 260—29.6)

The invention relates to coated cellulosic webs and to a coating composition useful in the production of the coated webs.

In the preparation of a coated cellulosic web, e.g. a paper web, it is conventional practice to form a mixture of water and a pigment, such as clay or the like, sometimes with other materials such as, for example, a soluble pyrophosphate which may act as a dispersing and stabilizing agent. This mixture, commonly termed a pigment "slip" or, since it usually contains clay, a clay "slip," is then compounded with a binder or adhesive material to produce a composition known in the art as a coating "color," which is useful for coating a cellulose web, e.g. a paper or paperboard web. Substantial quantities of the binder are used, and, accordingly, the composition and characteristics of the binder are of great importance in determining the qualities of the finished coated web. It is important that the binder impart to the coating color or to the finished coated web a high degree of brightness, smoothness and gloss, and a good finish and feel after calendering. In addition to these basic qualities required in coatings, there are several other desired characteristics viz. (1) the coating color must flow smoothly and evenly so that it can be applied to the cellulosic web at sufficiently high speeds to be economical in ordinary coating processes; (2) the coating must have high strength, to permit subsequent printing on the coated paper without "picking," and (3) the coating must have a high "wet-rub" resistance for those uses in which the coated web is treated with water, as for example, in offset printing.

It is, accordingly, an object of this invention to provide an improved coating composition for the preparation of coated webs having the above-described desirable surface characteristics.

In accordance with the present invention, there is provided a coating composition containing an adhesive or binder comprising polyvinyl alcohol, a synthetic polymer latex, and glyoxal, together with clay and the usual paper coating additives. The individual components of the composition are well-known materials and articles of commerce. The combination of these materials, in relationships described below, provides a coating material having many desirable characteristics and advantages.

Polyvinyl alcohol is commonly produced by the hydrolysis of polyvinyl acetate. The hydrolysis—more correctly "alcoholysis"—can be carried to any degree of completion, resulting in polyvinyl alcohol of several different degrees of hydrolysis or grades. The percentage hydrolysis indicates the percentage of the original acetate groups that have been replaced by —OH groups. Arbitrarily, any polyvinyl acetate which is more than 50% hydrolyzed is termed polyvinyl alcohol.

Starting from pure polyvinyl acetate, as the number of —OH groups increases, marked property changes occur. For example, the water solubility characteristics are greatly affected. The —OH groups have the initial effect of making the product more water sensitive, but then as they increase in number, and can therefore readily form intermolecular hydrogen bonds, the polymer becomes insoluble in cold water and can be dissolved only in hot water. At the same time, the increased ability to form hydrogen bonds produces greater cohesive as well as adhesive strength. In addition, as the number of —OH groups increases, resistance to organic solvents steadily increases. Whereas polyvinyl acetate is readily dissolved by organic solvents, fully hydrolyzed polyvinyl alcohol is totally unaffected by all but a few particular solvents. Hence, in general, the higher hydrolyzed grades will have the greatest water and organic solvent resistance and the best strength characteristics.

The molecular chain length of the polyvinyl alcohol also affects properties. The most outstanding effect is that as molecular weight increases the viscosity of solutions of polyvinyl alcohol increases. Water resistance also, is notably greater in the higher viscosity types. The degree of polymerization of the higher viscosity types is in the range of 1,500–3,000 and of the lower viscosity types, 200–1000.

Somewhat like starch, concentrated solutions of the highly hydrolyzed grades of polyvinyl alcohol tend to thicken and gel on standing. All molecular weight grades display this property. The gels are readily broken by heating but reform again on cooling. Polyvinyl alcohol that is less than 99% hydrolyzed is essentially free of this gelling tendency.

The percent hydrolysis of the polyvinyl alcohol suitable for use in accordance with this invention can vary from about 55 percent to 100 percent. Polyvinyl alcohol polymers having a viscosity between about 2 and 150 centipoises in a 4 percent solution at 20° C. are suitable for this application. However, studies have shown that for best coating color work the polyvinyl alcohol should be highly hydrolyzed and should be of the medium viscosity type, viz. having a viscosity of 20–40 centipoises. The higher the degree of hydrolysis the greater is the pick strength and the water resistance of the finished coating. The medium viscosity type of polyvinyl alcohol provides pick strength that is greater than that achievable with the low viscosity types but essentially equivalent to that of the high viscosity types. Since it allows for the preparation of colors with high solids, the medium viscosity type is preferred.

Especially suitable for use in the coating compositions of the present invention is polyvinyl alcohol which has an extremely high degree of hydrolysis. Such materials are known in the art as "super-hydrolyzed" polyvinyl alcohol resin or fully hydrolyzed polyvinyl alcohol resin. The super grade may have a degree of hydrolysis of 99.7 percent or higher, and the fully hydrolyzed grade may have a percent hydrolysis of 99+ percent or higher. Such material is sold under a variety of trade names. Among the commercially available super-hydrolyzed grades may be mentioned Vinol 125 produced by Air Reduction Company, Incorporated. Among examples of fully hydrolyzed polyvinyl alcohol having a percent hydrolysis of 99+ percent may be mentioned Vinol 260, Vinol 230 and Vinol 205, produced by Air Reduction Company, Incorporated. Other polyvinyl alcohols having a percent hydrolysis between about 97 percent and 98 percent and sold under the trade names Vinol 350 and Vinol 355 by the same company are also especially suitable.

The super-hydrolyzed and fully hydrolyzed grades of polyvinyl alcohol have the advantage that films produced therefrom are extremely resistant to attack by cold water. The resistance of films produced from hydrolyzed water-soluble polyvinyl alcohol to cold water attack apparently reaches a maximum when the degree of hydrolysis of the polyvinyl alcohol is at a maximum.

The clay employed is conventional coating clay and is used in conventional manner in the form of a "slip," i.e., dispersed in water to a solids content, for example of 65.85%.

The present invention permits the use of any of the clays customarily used for coating paper, including the hydrous aluminum silicates of kaolin group clays, hydrated silica clays, and the specific types of clays recommended in "Kaolin Clays and Their Industrial Uses," copyrighted 1949 by J. M. Huber Corp., New York, N.Y., particularly in chapters 10–16.

In addition to clay itself, there may be utilized other paper filling compositions and materials such as, for example, calcium sulfate, titanium dioxide, blanc fixe, lithopone, zinc sulfide, zinc oxide, or other coating pigments in various ratios, e.g., up to 50% by weight of the clay. As previously indicated, the slip may also contain a small amount, e.g., 0.1 to 0.50, of a dispersing or stabilizing agent such as tetra-sodium pyrophosphate. The modification of the coating color using these materials will be within the knowledge of those skilled in the art.

The synthetic polymer latex is suitably either a synthetic elastomer latex such as the well-known styrene-butadiene copolymer latex, usually called GR-S latex, or an acrylic latex, or a vinyl acetate polymer latex. Each of these compositions is in the form of an aqueous dispersion, which is commonly referred to as a "latex" from analogy with natural rubber latex. Other synthetic elastomer latices in addition to styrene-butadiene copolymer latex can be used such as butadiene-acrylonitrile copolymer latex, styrene-isoprene copolymer latex, and the like.

Butadiene-styrene copolymers are commercially available with considerable choice as to the butadiene-styrene ratio, 75:25, 60:40, and 50:50 being common ratios, and all of these are satisfactory for use. A particularly suitable styrene-butadiene latex is the product sold commercially under the name Dow Latex 512-R. This is a 60 styrene-40 butadiene copolymer latex with a solids content of 48%. It will be understood, however, that any of the commercially-known styrene-butadiene latices can be used.

The acrylic latex is an acrylic ester homopolymer or copolymer dispersion, such as a polyethylacrylate dispersion, of the type used in the preparation of coatings for paper. Typical acrylic polymers which are available commercially in the form of aqueous dispersions or latices are described, for example, in Stump U.S. Patent 2,952,892 and include the polymers of acrylic esters formed with the lower alkyl alcohols such as methyl, ethyl and butyl alcohols. These may also be copolymerized with minor amounts of certain other materials such as methacrylates, styrene, or acrylonitrile, and such copolymers may also be used. A particularly suitable latex of this type is the well-known commercial product sold under the name "Rhoplex B-15," an acrylic ester polymer product having a solids content of about 46% referred to, for example, in the above-mentioned U.S. Patent 2,952,892. A similar product, also referred to in this patent, is Rhoplex S-1.

The vinyl acetate polymer latex or dispersion, sometimes referred to as an emulsion, can be a latex of polyvinyl acetate such as the product sold commercially under the name "Vinac 880." This product is a white, milky fluid with a solids content of about 48–49 percent. It has a pH of 6.5 and a particle size of 0.15 micron and is essentially nonionic. The invention, however, is in no way limited to this specific product and other vinyl acetate polymer latices suitable for use in the paper coating industry can be used. Another typical suitable latex is the product sold commercially under the name "Flexbond 330." Such vinyl acetate latices are, like the butadiene-styrene latices or the acrylic latices, well known articles of commerce.

The concentration of solids in the synthetic latex may be modified by the proportion of water employed in carrying out the polymerization. The latex may contain from 10 to 60 percent by weight or more of solids, although usually a latex containing from 35 to 50 percent solids is employed.

As previously indicated, the synthetic polymer latices which are employed in making the coating compositions of this invention are well known preparations and have been previously used in the manufacture of coatings for paper. The use of butadiene-styrene latices, such as Dow "Latex 512-R" is described, for example, in Tappi, vol. 38, No. 5, pages 288 to 291 (May 1955), and in Tappi, vol. 39, No. 10, pages 725 to 734 (October 1956). The use of acrylic latices, such as "Rhoplex B-15," is described, for example, in Tappi, vol. 38, No. 5, pages 309 to 315 (May 1955), and in Tappi, vol. 40, No. 3, pages 146 to 151 (March 1957). The present invention contemplates the use of such latices and equivalent synthetic polymer latices.

Glyoxal is sold commercially either as an aqueous solution or as a water soluble powder. This latter material is of high purity and is particularly preferred for the purposes of this invention. Ordinary commercial glyoxal contains substantial amounts of impurities, such as ethylene glycol, formaldehyde and color-forming compounds of various types and is thus less desirable but can, nevertheless, be effectively used.

The coating compositions, i.e. the "colors" of this invention can be prepared by any of several techniques. The usual method involves separately dissolving the polyvinyl alcohol in water and then combining the resulting solution and the synthetic polymer latex, with the pigment slip, along with the glyoxal.

Polyvinyl alcohol solutions are made by adding the dry polyvinyl alcohol to well agitated water. The use of warm water accelerates the overall preparation time. Some commercial products must, however, be added to cold water or lumping will occur. The temperature should then be brought to 200° F. and retained there for 20 to 30 min. This dissolving procedure is suitable for both the super-hydrolyzed grade and the fully hydrolyzed grade. The latter, however, being less water resistant, will dissolve somewhat faster.

While it is still warm the polyvinyl alcohol solution is combined with the clay slip. Pigment "shock" can sometimes occur while preparing colors. The employment of the lowest practicable solids polyvinyl alcohol solution, the combination of slip and solution while the latter is quite hot, the addition of the slip to the polyvinyl alcohol solution (rather than the reverse order of addition), and the addition of a small amount of tetrasodium pyrophosphate to the polyvinyl alcohol solution—although not necessary procedures—all tend to minimize the possibility of shock. The addition of surfactants to the polyvinyl alcohol solution is the preferred method for eliminating shock. Surfactants that also perform as defoamers can be employed. Typical defoaming agents include tributyl phosphate, pine oil, and symmetrical ditertiary acetylenic glycols sold under the trade name "Surfynol 104A."

The relative proportions of the several components of the coating composition of this invention may vary to suit individual requirements, but in all cases the polyvinyl alcohol is present in an amount at least equaling half of the amount of synthetic polymer latex (solid basis), and in general, the composition has the following relative relationships, per 100 parts of filler, all parts being by weight:

| | Parts |
|---|---|
| Clay [1] | 80 to 100 |
| Secondary filler, e.g. titanium dioxide [1] | 0 to 20 |
| Dispersing agent | 0.35 to 0.5 |
| Synthetic polymer latex (solids basis) | 7 to 11 |
| Polyvinyl alcohol (solids basis) | 3.5 to 6 |
| Glyoxal | 0.5 to 1.5 |
| Defoamer (anti-shock agent) | 0 to 0.2 |
| Water—sufficient to provide solids content of 35 to 70 percent. | |

[1] Total 100 parts.

For optimum results in the coating of paper or paperboard, it is preferred to prepare a coating color having a total solids composition which is relatively high, thus providing good surface coating qualities and economical operation. A preferred range of total solids for the coating color is between about 40 and 60 percent solids with an optimum value at about 45 to 55 percent. A composition containing an amount of total solids and binder (latex plus polyvinyl alcohol) in the ranges specified is characterized by being readily applied to the surface of the paper and by forming a highly resistant coating thereon. Thus, utilizing the coating color according to this invention, there is produced a clay-coated paper which is highly satisfactory for use in printing operations and is resistant to disturbance of the clay-coating surface through rubbing, picking, and the like.

In the preferred embodiment of this invention, the paper which has been coated by means of the coating color described herein is subjected to a further treatment causing the glyoxal to react with the binder so that the coating will become more resistant to the effects of water. This is effected by heating the coated web to 160 to 250° F. by passing it through conventional drying means, such as over a heated roll or through a bank of heaters.

The particular combination of components described above, including glyoxal, is significant in that it can be effectively used both in a neutral or slightly alkaline environment, e.g. up to pH 8, produces a coating which is characterized by excellent gloss, brightness, wet pick properties, finish, opacity and grease resistance as well as water resistance. This highly desirable combination of characteristics is obtained with the coating composition of this invention while maintaining the total binder level at a relatively low value in comparison with conventional practice. Not only is this an important factor from an economic standpoint, but it insures increased opacity in the coating.

The improved coating composition of this invention is applied to the fibrous web to be coated by any convenient means. Preferably, however, it is applied by means of a coating device of the type known in the art as a trailing blade coater, in which a pool of the coating composition is maintained in the bight between a backing roll around which the paper travels, and a flexible blade, one end of which extends close to the paper on the backing roll and meters the flow of the coating composition to the paper. A particularly suitable device is known in the industry as a Champion coater, in which a reverse running furnish roll supplies excess color to the web, and a driven, reverse running rod doctors and smooths the color. What is unique about these installations is the fact that they are almost invariably found far back in the machine, close to the wet end; hence, many hot can driers come in direct contact with the coating after it is applied. The coating can be applied at one time or a plurality of times. In practice, two coaters are used with driers between them. Typically about twenty steam cans follow the first coater and about forty more follow the second coating station. The Champions are so located because at these points the web is still wet and flexible, hence better wiping action is achieved at the smoothing rod. With the steam can drying it has been found that the coatings could be cured to a very high degree of water resistance, wet rub and wet pick resistance.

As previously mentioned, the invention is in no way restricted to Champion coaters. The coating composition performs well on roll coaters, air knife coaters and on blade coaters, and in the latter cases speeds in excess of 2000 f.p.m. are involved. Also, other types of drying systems are suitable.

The invention will now be more specifically illustrated by reference to the following examples of practical application, it being understood that these examples are given for illustrative purposes only and are not limitative of the invention.

Example 1

A pigment slip was prepared by mixing 800 parts of clay, 160 parts of titanium dioxide and 2 parts of tetrasodium pyrophosphate with 640 parts of water to yield a product containing about 60 percent solids and the mixture was thoroughly mixed for 4 hours. At the same time, there was prepared a solution of 50 parts of polyvinyl alcohol (Vinol 125, which is a super-hydrolyzed polyvinyl alcohol having a percent hydrolysis of 99.7 plus and a viscosity of 28–32 centipoises in a 4 percent aqueous solution) and 0.4 parts of tetrasodium pyrophosphate in 520 parts of water. Steam was injected to bring the temperature to 205° F., where it was maintained for ½ hour while the solution was mixed and 1 lb. of tributyl phosphate and an additional 120 parts of water were then added. The solution of polyvinyl alcohol was then fed gradually into the pigment slip, with mixing, and then 21.2 parts of calcium stearate (Nopcote C-104), 195 parts of Dow 630 Latex (styrene-butadiene 48 percent solids), 1 part of additional tributyl phosphate and 25 parts of a 40 percent solution of glyoxal. The resulting "color" was allowed to mix overnight. The finished color was very smooth and foam-free and had a blue-white hue with a total solids content of 43 percent and a viscosity of 230 centipoises. The following table sets forth the composition of this coating color:

TABLE I

| Material | Quantity | Parts Based On 100 Parts Pigment |
|---|---|---|
| Clay | 800 | 83.3. |
| Titanium dioxide | 160 | 16.7. |
| TSPP | 2.4 | .24. |
| Vinol 125 | 50 | 5.2. |
| Dow 630 Latex (solids) | 94.5 (197.0 wet) | 9.8 (20.5 wet). |
| Nopcote (solids) | 21.2 (42.4 wet) | 2.2 (4.4 wet). |
| TBP | 2 | .21. |
| Glyoxal 40% (solids) | 10 (25 wet) | 1.0 (2.5 wet). |
| Water (including steam) | 1,341 | 140. |

This coating color was then applied to paperboard stock with two Champion coaters with the machine being run at the rate of 150 feet per minute. The coating was then tested in conventional manner and the following results were observed on the dried coating, which was found to dry very easily with the conventional drying apparatus on the machine:

TABLE II

| | |
|---|---|
| Brightness | 77.75 |
| Gloss, 75° | 52.1 |
| Dennison wax pick | 10 |
| Wet pick | Very good |
| Wet rub | 7.5 |

The brightness was measured at 45° in accordance with TAPPI Standard T 452 m-48. The gloss was measured in accordance with TAPPI Standard T 480 m-51 and the Dennison wax pick values were obtained by the standard Dennison wax test to provide a numerical indication of the effectiveness of the coating color, particularly with respect to its printing qualities.

The wet rub tests were made by placing a large drop of water on the board at a point 1 inch from its edge. After one minute the index finger is drawn across the wet spot and off the board onto black paper. Five such strokes, with medium pressure, are made. After drying, any deposition of pigment onto the black paper is readily observed. Wet rub number values are then assigned to the board according to standard. A value of "1" is poorest and "8" is the ideal.

The wet pick properties are measured on a Vandercook proofpress. A printing wedge, or ink gauge, filled with ink is used as a printing plate. During the print run the test sheet is wetted by a thick film of water before striking the printing plate. The greatest picking force is close to the zero ink film thickness of the gauge while the least force is at the maximum or 1 mil ink thickness. A sheet characterized as "poor" is a typical, poorly water resistant, letterpress paper while that characterized as "excellent" is a highly water resistant offset sheet.

Example 2

Following the procedure described in Example 1 but using Surfynol 104A as the anti-shock defoamer agent, instead of tributyl phosphate, and using Dow 512R butadiene-styrene Latex, instead of Dow 630 Latex, and omitting calcium stearate, there was prepared a coating color having the following composition:

TABLE III

| Material | Quantity | Parts Based On 100 Parts Pigment |
|---|---|---|
| Clay | 1,800 | 90. |
| Titanium dioxide | 200 | 10. |
| TSPP | 2 | .1. |
| Vinol 125 | 114 | 5.7. |
| Surfynol 104A | 0.3 | 0.15. |
| Dow 512R (solids) | ¹ 144 | 7.2. |
| Glyoxal 40% (solids) | ² 20 | 1.0. |
| Water (including steam) | 2,787 | 139.6. |

¹ 300 wet.
² 50 wet.

This coating color had a solids content of 45 percent and a viscosity comparable to that of the coating color used in Example 1. As in Example 1, the coating color was applied to a paperboard stock in conventional manner with Champion coaters. The coating was then tested in conventional manner and the following results were observed on the dried coating which was found to dry very easily with the conventional drying apparatus on the machine.

TABLE IV

Brightness _____ 78.25
Gloss, 75° _____ 54.5
Dennison wax pick _____ 9
Wet pick _____ Very good
Wet rub _____ 6.5

Example 3

Following the procedure described in Example 1 but using the reagent of Example 2, except that Rhoplex B15 (acrylic polymer latex) was substituted for the butadiene-styrene latex, there was prepared a coating color having the following composition:

TABLE V

| Material | Quantity | Parts Based On 100 Parts Pigment |
|---|---|---|
| Clay | 1,800 | 90. |
| Titanium doxide | 200 | 10. |
| TSPP | 2 | .1. |
| Vinol 125 | 110 | 5.5. |
| Surfynol 104A | 0.28 | 0.14. |
| Rhoplex B15 (solids) | ¹ 160 | 8.0. |
| Glyoxal 40% (solids) | ² 20 | 1.0. |
| Water (including steam) | 2,787 | 139.6. |

¹ 348 wet.
² 50 wet.

When this coating color is applied to a fibrous web with a Champion coater, a film is deposited on the web which has the following characteristics:

TABLE VI

Brightness _____ 78
Gloss, 75° _____ 52
Dennison wax pick _____ 10
Wet pick _____ Very good
Wet rub _____ 7

Example 4

Again following the procedure described in Example 1, but substituting a polyvinyl acetate homopolymer latex having a solids content of 49 percent (Vinac 880), there is readily prepared a coating color having the following composition:

TABLE VII

| Material | Quantity | Parts Based On 100 Parts Pigment |
|---|---|---|
| Clay | 800 | 83.3. |
| Titanium dioxide | 160 | 16.7. |
| TSPP | 2.4 | .24. |
| Vinol 125 | 50 | 5.2. |
| Vinac 880 | 94.5 (192.9 wet) | 9.8 (20 wet). |
| Nopcote (solids) | 21.2 (42.4 wet) | 2.2 (4.4 wet). |
| TBP | 2 | .21. |
| Glyoxal 40% (solids) | 10 (25 wet) | 1.0 (2.5 wet). |
| Water (including steam) | 1,341 | 140. |

When this coating color is applied to a fibrous web with a Champion coater, a film is deposited on the web which has the following characteristics:

TABLE VIII

Gloss, 75° _____ 52
Brightness _____ 78
Dennison wax pick _____ 10
Wet pick _____ Very good
Wet rub _____ 7

It will be understood that the coating composition of this invention can be applied to any fibrous web, particularly webs formed from cellulosic fibers, but it is of particular utility in the coating of folding boxboard and in Examples 1, 2, and 3 described above, a patent coated web was employed. Similarly it will be understood that the coating can be applied in various quantities depending upon the particular web being treated and, in general, the same quantities were used as are employed in the art with conventional coating compositions, e.g. 3 to 4 lbs. (dry basis) per thousand square feet. In Examples 1 to 3 above, the coating compositions described were applied in the amount of about 3.5 lbs. per thousand square feet. It will also be understood that the web, after coating and drying, may be given any of the conventional treatments such as calendering and the coating of this invention, when calendered, gives a particularly bright, glossy and opaque film.

While the invention has been described in details of certain specific embodiments, it will be understood that various changes and modifications may be made without departing from the scope of the invention, as defined in the appended claims, and it is intended, therefore, that all matter contained in the foregoing description shall be interpreted as illustrative only and not as limitative of the invention.

We claim:
1. An aqueous coating composition for application to a paper web comprising polyvinyl alcohol, a synthetic polymer latex, glyoxal and a mineral clay filler, the solids contents of said composition being 35 to 70% and, per 100 parts by weight of said mineral filler, the polyvinyl alcohol being present in the amount of 3.5 to 6, said synthetic polymer being present in the amount of 7 to 11 parts, and said glyoxal being present in the amount of 0.5 to 1.5 parts, said polyvinyl alcohol being present in an amount which is at least one-half the amount of said synthetic polymer, said synthetic polymer being selected from the group consisting of polymers of lower alkyl acrylic esters, polymers of vinyl acetate, and copolymers of butadiene-styrene containing at least 25% styrene.

2. A paper web coated with a solid coating deposited upon the evaporation of water from an aqueous coating composition applied to said web and comprising polyvinyl alcohol, a synthetic polymer latex, glyoxal and a mineral clay filler, the solids contents of said composition being 35 to 70% and, per 100 parts by weight of said mineral filler, the polyvinyl alcohol being present in the amount of 3.5 to 6, said synthetic polymer being present in the amount of 7 to 11 parts, and said glyoxal being present in the amount of 0.5 to 1.5 parts, said polyvinyl alcohol being present in an amount which is at least one-half the amount of said synthetic polymer, said synthetic polymer being selected from the group consisting of polymers of lower alkyl acrylic esters, polymers of vinyl acetate, and copolymers of butadiene-styrene containing at least 25% styrene.

3. A method of providing a paper web with a film characterized by high gloss and wet rub resistance which comprises applying to said web an aqueous coating composition comprising polyvinyl alcohol, a synthetic polymer latex, glyoxal and a mineral clay filler, the solids contents of said composition being 35 to 70% and, per 100 parts by weight of said mineral filler, the polyvinyl alcohol being present in the amount of 3.5 to 6, said synthetic polymer being present in the amount of 7 to 11 parts, and said glyoxal being present in the amount of 0.5 to 1.5 parts, said polyvinyl alcohol being present in an amount which is at least one-half the amount of said synthetic polymer, and drying said coating composition on said web, said synthetic polymer being selected from the group consisting of polymers of lower alkyl acrylic esters, polymers of vinyl acetate, and copolymers of butadiene-styrene containing at least 25% styrene.

References Cited by the Examiner

UNITED STATES PATENTS

| | | | |
|---|---|---|---|
| 2,500,144 | 3/1950 | Beck | 260—29.6 |
| 2,510,257 | 6/1950 | Robinson | 260—29.6 |
| 2,662,040 | 12/1953 | Thomas | 260—29.7 |
| 2,773,050 | 12/1956 | Caldwell et al. | 260—29.6 |
| 3,079,356 | 2/1963 | Oda | 260—29.6 |

MURRAY TILLMAN, *Primary Examiner.*

N. F. OBLON, *Assistant Examiner.*